(12) United States Patent
Jang et al.

(10) Patent No.: US 10,160,338 B1
(45) Date of Patent: Dec. 25, 2018

(54) CONTROL SYSTEM AND METHOD FOR ON-BOARD BATTERY CHARGER OF VEHICLE

(71) Applicants: HYUNDAI MOTOR COMPANY, Seoul (KR); KIA MOTORS CORPORATION, Seoul (KR)

(72) Inventors: Hui Sung Jang, Suwon-si (KR); Gi Bong Son, Hwaseong-si (KR); Hyun Wook Seong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/804,788

(22) Filed: Nov. 6, 2017

(30) Foreign Application Priority Data

Jun. 26, 2017 (KR) .......................... 10-2017-0080553

(51) Int. Cl.
| | | |
|---|---|---|
| *B60L 11/18* | (2006.01) | |
| *H02M 1/42* | (2007.01) | |
| *B60W 10/26* | (2006.01) | |
| *H02M 3/337* | (2006.01) | |

(52) U.S. Cl.
CPC ....... *B60L 11/1811* (2013.01); *B60L 11/1861* (2013.01); *B60W 10/26* (2013.01); *H02M 1/4241* (2013.01); *H02M 3/337* (2013.01)

(58) Field of Classification Search
CPC ....... H02M 2001/0067; H02M 1/4225; H02M 1/4241; H02M 2007/4818

USPC ..... 363/21.02, 21.03, 40–43, 65, 67, 68, 78, 363/79, 95, 98, 165
See application file for complete search history.

(56) References Cited

U.S. PATENT DOCUMENTS

| | | | | |
|---|---|---|---|---|
| 2010/0020578 A1* | 1/2010 | Ryu | ..................... | H02M 1/4225 363/68 |
| 2010/0156509 A1* | 6/2010 | Ryu | ..................... | H02M 1/4208 327/520 |
| 2015/0103562 A1* | 4/2015 | Yeh | ..................... | H02M 3/3353 363/17 |
| 2015/0162817 A1* | 6/2015 | Lee | ......................... | H02J 7/007 320/107 |
| 2015/0171740 A1* | 6/2015 | Seong | ................. | H02M 1/4208 320/162 |
| 2015/0198634 A1* | 7/2015 | Brinlee | .................. | G01R 31/28 324/72.5 |
| 2015/0349560 A1* | 12/2015 | Seong | ...................... | B60L 3/00 320/107 |
| 2016/0141964 A1* | 5/2016 | Yu | ..................... | H02M 3/33507 363/21.02 |

FOREIGN PATENT DOCUMENTS

KR    10-2016-0095536 A    8/2016

\* cited by examiner

*Primary Examiner* — Gary Nash
(74) *Attorney, Agent, or Firm* — McDermott Will & Emery LLP

(57) ABSTRACT

A control system and a method for an on-board battery charger (OBC) of a vehicle generate a DC link voltage instruction through a proportional integral control that regards, as an instruction, a resonance switching frequency determined by a resonance capacitance and a resonance inductance of the LLC converter and allow the switching frequency of an LLC converter to operate at the resonance frequency, thus enhancing efficiency of the OBC.

6 Claims, 4 Drawing Sheets

[FIG. 1]

[FIG. 4]
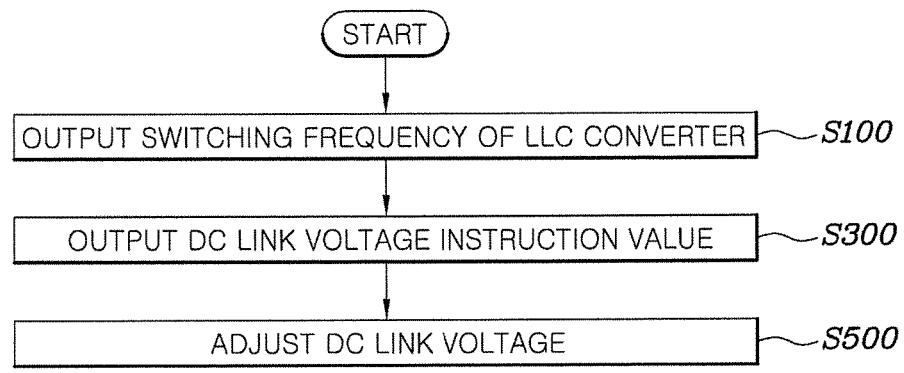

CONTROL SYSTEM AND METHOD FOR ON-BOARD BATTERY CHARGER OF VEHICLE

CROSS REFERENCE TO RELATED APPLICATION

The present application is based on and claims the benefit of priority to Korean Patent Application No. 10-2017-0080553 filed on Jun. 26, 2017 with the Korean Intellectual Property Office, the entire contents of which is incorporated herein for all purposes by this reference.

TECHNICAL FIELD

The present disclosure relates to a control system and a method for an on-board battery charger (OBC) of a vehicle, and more particularly, to a control system and a method for an OBC of a vehicle for generating a DC link voltage instruction through a proportional integral control that regards, as an instruction, a resonance switching frequency determined by a resonance capacitance and a resonance inductance in an LLC converter and allowing the switching frequency of the LLC converter to operate at a resonance frequency, thus enhancing efficiency of the OBC.

BACKGROUND

An eco-friendly vehicle includes a hybrid vehicle, a plug-in hybrid vehicle, an electric vehicle, a fuel battery vehicle and the like, and among them, the plug-in hybrid vehicle and the electric vehicle may be charged by a user using a household AC power source and equipped with an on-board battery charger (OBC).

The OBC mounted within the plug-in hybrid vehicle and the electric vehicle consists of an EMI filter for removing a noise from an AC power source, a PFC converter for controlling a power factor, and a DC-DC converter for controlling insulation and an output current.

An LLC converter, as a resonant-type PWM converter, hardwarely uses a switching method for enhancing efficiency. However, a conventional non-resonant-type PWM converter uses a method for controlling output voltage and current by adjusting a duty, while the LLC resonant-type PWM converter uses a method for controlling output voltage and current by adjusting a switching frequency. Efficiency of the LLC resonant-type PWM converter heavily depends on an operational range of the switching frequency, and it is very important for the switching frequency to locate a resonance frequency.

Conventionally, the DC link voltage (input voltage of LLC converter=output voltage of PFC converter) instruction was generated by sensing output voltage and output current of the LLC converter, and therefore no required DC link voltage was generated when a sensing error was occurred. To this end, the LLC converter did not operate at the resonance frequency, and therefore there was a problem to reduce efficiency of the OBC. Furthermore, conventionally, since the DC link voltage instruction was generated by a map extraction, there was needed the step of checking the switching frequency in all intervals of the output voltage and the output current, and therefore, inevitable problems of additional manpower and cost may exist.

Accordingly, there has been needed a solution that allows the switching frequency of the LLC converter to operates at the resonance frequency and solves these problems.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a control system and a method for an on-board battery charger (OBC) of a vehicle for generating a DC link voltage instruction through a proportional integral control that regards, as an instruction, a resonance switching frequency determined by a resonance capacitance and a resonance inductance in an LLC converter and allowing the switching frequency of the LLC converter to operate at the resonance frequency, thus enhancing efficiency of the OBC.

A control system for an OBC of a vehicle according to the present disclosure for achieving the above objective comprises a power factor correction converter converting an AC power input from an external AC power source into a DC power and outputting the DC power; an LLC converter adjusting, through a switching, a level of an output voltage or an output current with respect to the DC power input from the power factor correction converter; and a controller outputting the switching frequency of the LLC converter, and receiving the outputted switching frequency of the LLC converter and the resonance frequency of a resonant circuit in the LLC converter and adjusting an input terminal voltage of the LLC converter so that the switching frequency of the LLC converter becomes the resonance frequency.

The controller comprises an LLC converter controller receiving an output current instruction value and an output current sensing value of the LLC converter and outputting the switching frequency of the LLC converter; a voltage instruction generator receiving the switching frequency output from the LLC converter controller and the resonance frequency of the resonant circuit in the LLC converter and outputting a voltage instruction value of the input terminal of the LLC converter so that the switching frequency of the LLC converter becomes the resonance frequency; and a power factor correction converter controller receiving the voltage instruction value of the input terminal of the LLC converter output from the voltage instruction generator and a voltage sensing value of the input terminal of the LLC converter and adjusting an output voltage of the power factor correction converter.

The controller is characterized by further comprising a conversion compensator summing up a value that multiplies the output voltage sensing value of the LLC converter by a gain value and the output value of the voltage instruction generator and outputting the voltage instruction value of the input terminal of the LLC converter.

The gain value of the conversion compensator is determined by considering a turn ratio of a transformer in the LLC converter.

The power factor correction converter controller comprises a voltage controller receiving the voltage instruction value of the input terminal of the LLC converter output from the voltage instruction generator and the voltage sensing value of the input terminal of the LLC converter and outputting an input current instruction value; and a current controller receiving the outputted input current instruction value, a voltage sensing value of an external AC power source, and an input current sensing value and outputting a switching duty of the power factor correction converter controller.

A control method for an OBC of a vehicle according to the present disclosure comprises receiving an output current instruction value and an output current sensing value of an LLC converter and outputting a switching frequency of the LLC converter; and receiving the outputted switching frequency of the LLC converter and a resonance frequency of a resonant circuit in the LLC converter and adjusting an input terminal voltage of the LLC converter so that the switching frequency of the LLC converter becomes the resonance frequency.

The adjusting of an input terminal voltage of the LLC converter comprises receiving the outputted switching frequency and the resonance frequency of the resonant circuit in the LLC converter and outputting a voltage instruction value of the input terminal of the LLC converter so that the switching frequency of the LLC converter becomes the resonance frequency; and receiving the outputted voltage instruction value of the input terminal of the LLC converter and a voltage sensing value of the input terminal of the LLC converter and adjusting an output voltage of a power factor correction converter.

The outputting of a voltage instruction value of the input terminal of the LLC converter is characterized by summing up the voltage instruction value of the input terminal of the LLC converter and a value that multiplies the output voltage sensing value of the LLC converter by a gain value and outputting the voltage instruction value of the input terminal of the LLC converter.

The gain value is determined by considering a turn ratio of a transformer in the LLC converter.

According to the control system and method for the OBC of the vehicle of the present disclosure, it is possible to enhance efficiency of the OBC, by generating the DC link voltage instruction through a proportional integral control that regards, as an instruction, the resonance switching frequency determined by the resonance capacitance and the resonance inductance of the LLC converter and allowing the switching frequency of the LLC converter to operate at the resonance frequency, As a result, no additional manpower due to an instruction map extraction is required and cost is saved by outputting the DC link voltage instruction through the controller.

BRIEF DESCRIPTION OF THE DRAWINGS

The above and other objects, features and other advantages of the present disclosure will be more clearly understood from the following detailed description when taken in conjunction with the accompanying drawings, in which:

FIG. 4 is a flowchart illustrating a control method for an OBC of a vehicle according to one embodiment of the present disclosure.

DETAILED DESCRIPTION

Hereinafter, a control system and a method for an OBC of a vehicle according to various embodiments of the present disclosure will be described in detail with reference to the accompanying drawings.

Figure 1:
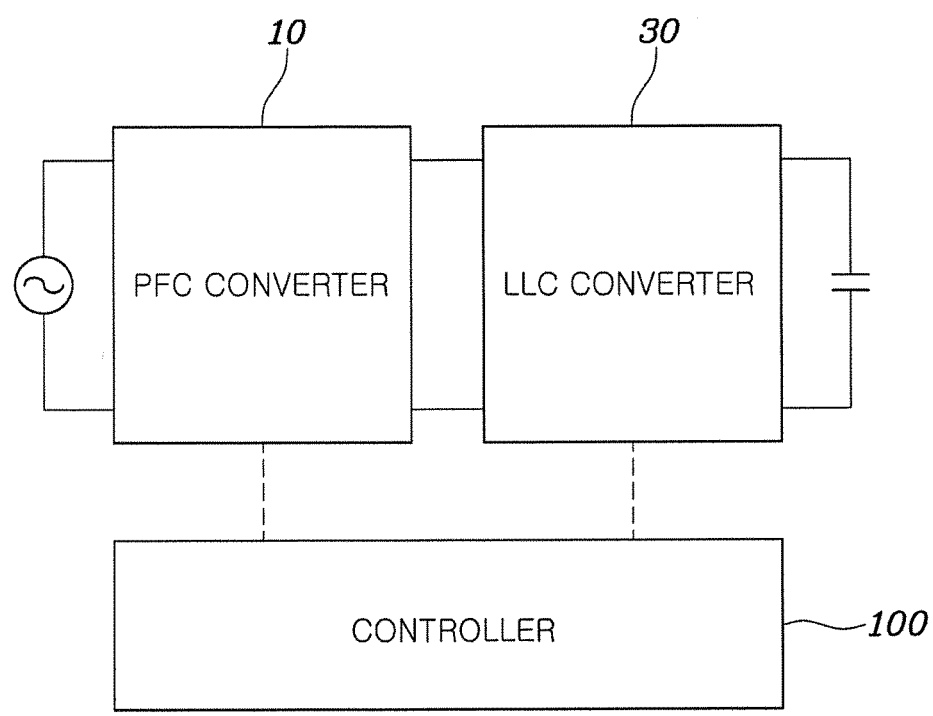
FIGS. 1 to 3 are a block diagram illustrating a control system for an OBC of a vehicle according to one embodiment of the present disclosure.
Figure 2:
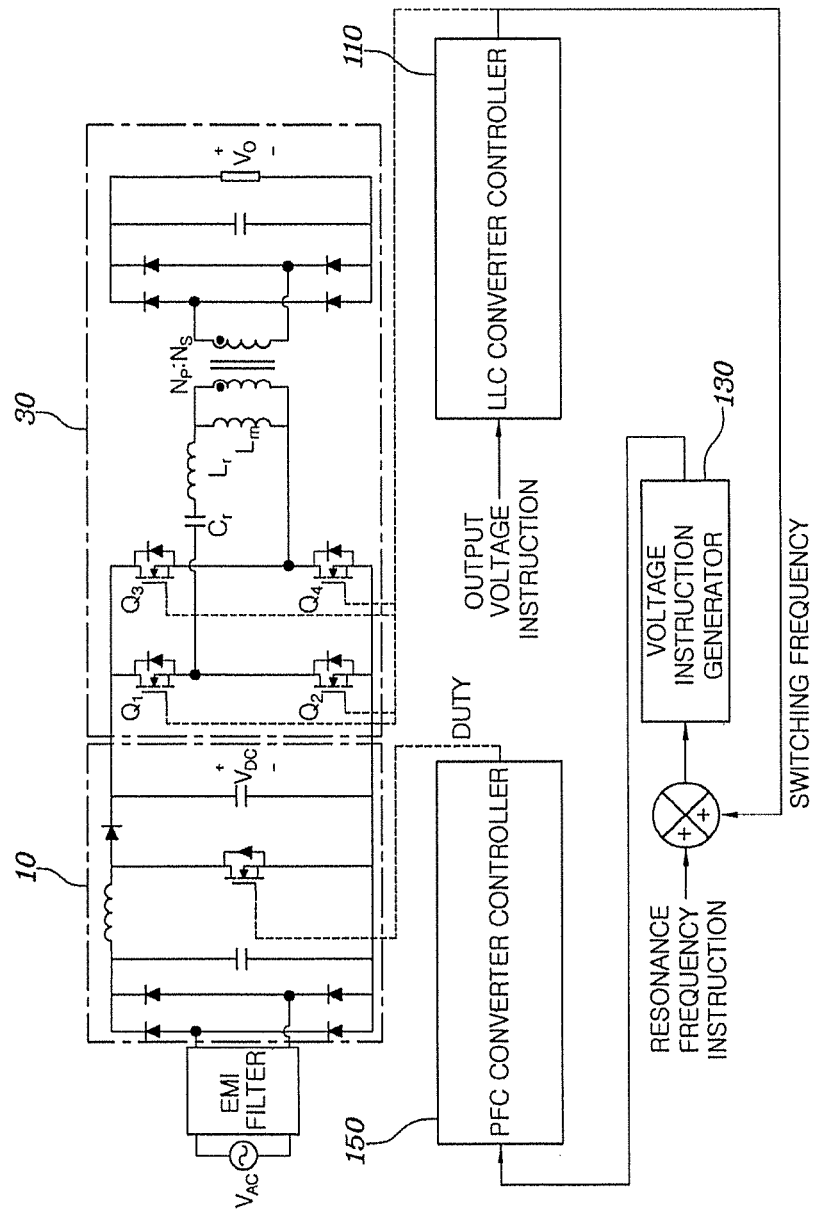
Figure 3:
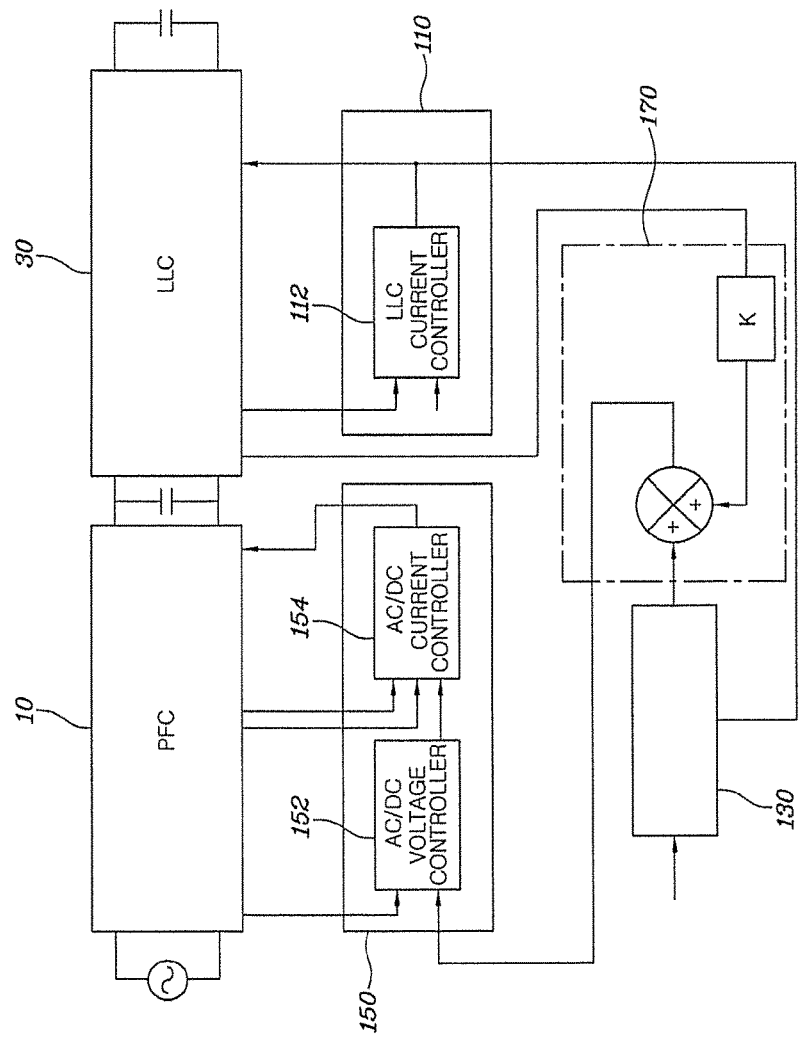

FIGS. 1 to 3 are a block diagram illustrating a control system for an OBC of a vehicle according to one embodiment of the present disclosure, and FIG. 4 is a flowchart illustrating a control method for an OBC of a vehicle according to one embodiment of the present disclosure.

First, referring to FIGS. 1 and 2, a control system for an OBC of a vehicle according to one embodiment of the present disclosure may comprise a power factor correction (PFC) converter 10 converting an AC power input from an external AC power source into a DC power and outputting the DC power; an LLC converter 30 adjusting, through a switching, a level of an output voltage or an output current with respect to the DC power input from the PFC converter 10; and a controller 100 outputting a switching frequency of the LLC converter 30, and receiving the outputted switching frequency of the LLC converter 30 and a resonance frequency of a resonant circuit in the LLC converter 30 and adjusting an input terminal voltage of the LLC converter 30 so that the switching frequency of the LLC converter 30 becomes the resonance frequency.

Herein, the PFC converter 10 reduces an invalid power of an external AC power source and converts into and outputs a DC voltage.

The LLC converter 30, as a resonant-type PWM converter, receives the DC voltage output from the power factor correction portion and adjusting and outputting a level of an output voltage or an output current.

The controller 100 may comprise an LLC converter controller 110, a voltage instruction generator 130, and a power factor correction converter controller 150.

The controller 100 and its sub-controllers, including the LLC converter controller 110, the voltage instruction generator 130, and the power factor correction converter controller 150, are an electric circuitry that executes instructions of software which thereby performs various functions described hereinafter.

An Equation 1 below indicates a transfer function for an output voltage/an input voltage of the resonant circuit (a resonant tank) in the LLC converter 30, and it will be understood that the switching frequency ($f_s$) and a DC link voltage ($V_{dc}$) of the LLC converter 30 have a direct proportional characteristics. Accordingly, the present disclosure is to variably control the DC link voltage so that the switching frequency of the LLC converter 30 operates at the resonance frequency of the resonant circuit using the direct proportional characteristics of the switching frequency and the DC link voltage. As a result, the present disclosure may enhance operation efficiency of the OBC.

Equaiton 1

$$\frac{V_O}{V_{DC}} = \frac{\frac{f_s^2}{f_r^2}(m-1)}{n\sqrt{\left(m\frac{f_s^2}{f_r^2}-1\right)^2 + \frac{f_s^2}{f_r^2}\left(\frac{f_s^2}{f_r^2}-1\right)^2(m-1)^2\left(\frac{\pi^2\sqrt{L_r/C_r}}{8n^2R_o}\right)^2}}$$

($V_O$: an output voltage of the LLC converter 30, $V_{DC}$: an input voltage of the LLC converter 30 (PFC output voltage), $f_s$: a switching frequency of the LLC converter 30, $f_r$: a resonance frequency of the resonant circuit in the LLC converter 30, $$m: \frac{Lr + Lm}{Lr},$$

n: a turn ratio $$\left(\frac{Np}{Ns}\right),$$

R$_o$: an output terminal resistance of the LLC converter 30)

Next, an operation of the controller 100 will be described. The controller 100 may output the switching frequency of the LLC converter 30, and receive the outputted switching frequency of the LLC converter 30 and the resonance frequency of the resonant circuit in the LLC converter 30 and adjust an input terminal voltage of the LLC converter 30 so that the switching frequency of the LLC converter 30 becomes the resonance frequency. More specifically, the controller 100 receives an output voltage instruction of the LLC converter 30 and outputs the switching frequency output from the LLC converter controller 110 outputting the switching frequency, and performs a proportional integral control (PI control) through the voltage instruction generator 130 so that the switching frequency follows an instruction value of the resonance frequency. A DC link voltage instruction value indicating an instruction value of the input terminal of the LLC converter 30 is output from the voltage instruction generator 130; the value is input to the power factor correction converter controller 150; a duty value of the power factor correction converter controller 150 allowing the switching frequency of the LLC converter 30 to operate at the resonance frequency is output; and an output voltage of the PFC converter 10 is adjusted.

Referring to FIG. 3, the LLC converter controller 110, as one embodiment of the present disclosure, may comprise an LLC voltage controller receiving the output voltage instruction of the LLC converter 30 and extracting an output current instruction value and an LLC current controller 112 receiving the output current instruction value and an output current sensing value and outputting the switching frequency of the LLC converter 30 through a proportional integral control (PI control).

The voltage instruction generator 130 receives the switching frequency output from the LLC converter controller 110 and the resonance frequency of the resonant circuit in the LLC converter 30 and outputs the voltage instruction value of the input terminal of the LLC converter 30 through a proportional integral control (PI control) so that the switching frequency follows an instruction value of the resonance frequency.

The resonance frequency indicates a frequency determined by a resonance capacitance (Cr) and a resonance inductance (Lr) of the resonant circuit in the LLC converter 30 and the switching frequency indicates a frequency output from the LLC converter controller 110.

The power factor correction converter controller 150, as one embodiment of the present disclosure, may comprise a voltage controller 152 receiving the voltage instruction value of the input terminal of the LLC converter 30 output from the voltage instruction generator 130 and a voltage sensing value of the input terminal of the LLC converter 30 and outputting an input current instruction value and a current controller 154 receiving the outputted input current instruction value, a voltage sensing value of an external AC power source, and an input current sensing value and outputting a switching duty of the power factor correction converter controller 150.

The voltage controller 152 outputs the input current instruction value flowing through an inductor of the PFC converter 10 through a proportional integral control (PI control) with respect to the output voltage sensing value of the PFC converter 10 and the voltage instruction value of the input terminal of the LLC converter 30 output from the voltage instruction generator 130. The current controller 154 receives a value multiplying the outputted input current instruction value of the RMS by the input voltage sensing value of an external AC power source and the input current sensing value flowing through the inductor of the PFC converter 10 and outputs a switching duty of the power factor correction converter controller 150 through a proportional integral control (PI control).

In FIG. 3, the control system for the OBC of the vehicle according to one embodiment of the present disclosure may further comprise a conversion compensator 170 summing up a value that multiplies the output voltage sensing value of the LLC converter 30 by a gain value and the output value of the voltage instruction generator 130 and outputting the voltage instruction value of the input terminal of the LLC converter 30.

The conversion compensator 170 is implemented by a processor that has an associated non-transitory memory storing software instructions which, when executed by the processor, provides the functionalities of the conversion compensator 170.

The processor may take the form of one or more processor(s) and associated memory storing program instructions, and in some examples the one or more processor(s) may be used to implement the functions of both the controller 100 and the processor.

It is advantageous to reduce burden of the PI control in the voltage instruction generator 130 and obtain a stable response, by summing up the value output from the voltage instruction generator 130 and the value that multiplies the output voltage sensing value of the LLC converter 30 by the gain value and outputting the voltage instruction value of the input terminal of the LLC converter 30. And the gain value (K) of the conversion compensator 170 may be determined by a turn ratio (N$_p$:N$_s$) of a transformer in the LLC converter 30 and other factors.

Referring to FIG. 4, a control method for an OBC of a vehicle according to one embodiment of the present disclosure may comprise receiving an output current instruction value and an output current sensing value of an LLC converter and outputting a switching frequency of the LLC converter (S100); and receiving the outputted switching frequency of the LLC converter and a resonance frequency of a resonant circuit in the LLC converter and adjusting an input terminal voltage of the LLC converter so that the switching frequency of the LLC converter becomes the resonance frequency (S500).

The outputting of the switching frequency of the LLC converter (S100) receives an output voltage instruction of the LLC converter and extracts the output current instruction value, and receives the extracted output current instruction value and the output current sensing value and outputs the switching frequency of the LLC converter through a proportional integral control (PI control).

The adjusting of the input terminal voltage of the LLC converter (S500) receives the outputted switching frequency and the resonance frequency of the resonant circuit in the LLC converter and outputs the voltage instruction value of the input terminal of the LLC converter so that the switching frequency becomes the resonance frequency (S300); and outputs an input current instruction value flowing through an inductor in a power factor correction converter through a proportional integral control (PI control) with respect to the outputted voltage instruction value of the input terminal of the LLC converter and an output voltage sensing value of the power factor correction converter. And, the adjusting of the input terminal voltage of the LLC (S500) receives a value multiplying the outputted input current instruction value of the RMS by an input voltage sensing value of an external AC power source and the input current sensing value flowing through the inductor of the power factor correction converter and outputs a switching duty of the power factor correction converter controller through a proportional integral control (PI control) (S500). A DC link voltage instruction, by repetitive control, indicating the output voltage of the power factor correction converter controller generated by the outputted switching duty finally allows the switching frequency of the LLC converter to operate at the resonance frequency. As a result, it is possible to enhance efficiency of the OBC; by outputting the DC link voltage instruction through the controller, no additional manpower due to an instruction map extraction and the like is required and cost is saved.

The control method for the OBC of the vehicle according to one embodiment of the present disclosure may, in the outputting of the voltage instruction value of the input terminal of the LLC converter (S300), sum up the outputted voltage instruction value of the input terminal of the LLC converter and the value multiplying the output voltage sensing value of the LLC converter by the gain value and output the voltage instruction value of the input terminal of the LLC converter.

As a result, it is advantageous to reduce burden of a PI control and obtain a stable response, by summing up the outputted voltage instruction value of the input terminal of the LLC converter and the value that multiplies the output voltage sensing value of the LLC converter by the gain value and outputting the voltage instruction value of the input terminal of the LLC converter. And the gain value (K) may be determined by a turn ratio ($N_p:N_s$) of a transformer in the LLC converter 30 and other factors.

As described above, the control system and method for the OBC of the vehicle according to various embodiments of the present disclosure generate the DC link voltage instruction through a proportional integral control that regards, as an instruction, the resonance switching frequency determined by the resonance capacitance and the resonance inductance of the LLC converter and allow the switching frequency of the LLC converter to operate at the resonance frequency, thus enhancing efficiency of the OBC.

Furthermore, no additional manpower due to an instruction map extraction and the like is required and cost is saved by outputting the DC link voltage instruction through the controller.

Although various embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A control system for an on-board battery charger (OBC) of a vehicle comprising:
   a power factor correction (PFC) converter converting an AC power input from an external AC power source into a DC power and outputting the DC power;
   an LLC converter receiving the DC power from the PFC converter and adjusting, through a switching, a level of an output voltage or an output current; and
   a controller outputting a switching frequency of the LLC converter, and receiving the outputted switching frequency of the LLC converter and a resonance frequency of a resonant circuit in the LLC converter and adjusting an input terminal voltage of the LLC converter so that the switching frequency of the LLC converter becomes the resonance frequency,
   wherein the controller comprises:
   an LLC converter controller receiving an output current instruction value and an output current sensing value of the LLC converter and outputting the switching frequency of the LLC converter;
   a voltage instruction generator receiving the switching frequency output from the LLC converter controller and the resonance frequency of the resonant circuit in the LLC converter and outputting a voltage instruction value of the input terminal of the LLC converter so that the switching frequency of the LLC converter becomes the resonance frequency; and
   a power factor correction (PFC) converter controller receiving the voltage instruction value of the input terminal of the LLC converter output from the voltage instruction generator and a voltage sensing value of the input terminal of the LLC converter and adjusting an output voltage of the PFC converter.

2. The control system for the OBC of the vehicle according to claim 1, wherein the controller further comprises a conversion compensator summing up a value that multiplies an output voltage sensing value of the LLC converter by a gain value and the output value of the voltage instruction generator and outputting the voltage instruction value of the input terminal of the LLC converter.

3. The control system for the OBC of the vehicle according to claim 2, wherein the gain value of the conversion compensator is determined by considering a turn ratio of a transformer in the LLC converter.

4. The control system for the OBC of the vehicle according to claim 1, wherein the PFC converter controller comprises:
   a voltage controller receiving the voltage instruction value of the input terminal of the LLC converter output from the voltage instruction generator and the voltage sensing value of the input terminal of the LLC converter and outputting an input current instruction value; and
   a current controller receiving the outputted input current instruction value, a voltage sensing value of an external AC power source, and an input current sensing value and outputting a switching duty of the PFC converter controller.

5. A control method for an on-board battery charger (OBC) of a vehicle comprising:
   receiving an output current instruction value and an output current sensing value of an LLC converter and outputting a switching frequency of the LLC converter; and
   receiving the outputted switching frequency of the LLC converter and a resonance frequency of a resonant circuit in the LLC converter and adjusting an input terminal voltage of the LLC converter so that the switching frequency of the LLC converter becomes the resonance frequency,
   wherein the adjusting of an input terminal voltage of the LLC converter comprises:

receiving the outputted switching frequency and the resonance frequency of the resonant circuit in the LLC converter and outputting a voltage instruction value of the input terminal of the LLC converter so that the switching frequency of the LLC converter becomes the resonance frequency; and receiving the outputted voltage instruction value of the input terminal of the LLC converter and a voltage sensing value of the input terminal of the LLC converter and adjusting an output voltage of a power factor correction (PFC) converter, wherein the outputting of a voltage instruction value of the input terminal of the LLC converter comprises summing up the voltage instruction value of the input terminal of the LLC converter and a value that multiplies an output voltage sensing value of the LLC converter by a gain value and outputting the voltage instruction value of the input terminal of the LLC converter.

6. The control method for the OBC of the vehicle according to claim 5, wherein the gain value is determined by considering a turn ratio of a transformer in the LLC converter.

\* \* \* \* \*